United States Patent
Austin et al.

(10) Patent No.: US 6,448,361 B1
(45) Date of Patent: Sep. 10, 2002

(54) CONTINUOUS MANUFACTURE OF SILICONE COPOLYMERS

(75) Inventors: Paul E. Austin, Williamstown, WV (US); James S. Ritscher, Marietta, OH (US); Robert A. Kayser, Newport, OH (US); William E. Crane, Sistersville, WV (US); David D. Farris, Marietta, OH (US)

(73) Assignee: Crompton Corporation, Middlebury, CT (US)

( * ) Notice: Subject to any disclaimer, the term of this patent is extended or adjusted under 35 U.S.C. 154(b) by 0 days.

(21) Appl. No.: 09/398,749

(22) Filed: Sep. 17, 1999

Related U.S. Application Data

(62) Division of application No. 09/053,291, filed on Apr. 1, 1998, now Pat. No. 5,986,022.

(51) Int. Cl.[7] .................. C08G 77/04; C08G 77/14; C08G 77/18
(52) U.S. Cl. ............... 528/25; 528/15; 528/29; 528/31; 525/479; 525/476; 526/65
(58) Field of Search .................. 528/31, 15, 25, 528/29; 515/479; 526/65

(56) References Cited

U.S. PATENT DOCUMENTS

| | | |
|---|---|---|
| 2,834,748 A | 5/1958 | Bailey et al. |
| 3,980,688 A | 9/1976 | Litteral et al. |
| 4,025,456 A | 5/1977 | Litteral et al. |
| 4,782,095 A | 11/1988 | Gum |
| 4,801,447 A | 1/1989 | Gum |
| 4,847,398 A | 7/1989 | Mehta et al. |
| 4,857,583 A | 8/1989 | Austin et al. |
| 5,153,293 A | 10/1992 | Hales et al. |
| 5,159,096 A | 10/1992 | Austin et al. |
| 5,191,103 A | 3/1993 | Mehta et al. |
| 5,456,888 A | 10/1995 | Gilson et al. |
| 5,489,657 A | 2/1996 | Sue et al. |
| 5,504,266 A | 4/1996 | Tirtowidjojo et al. |

FOREIGN PATENT DOCUMENTS

| | | |
|---|---|---|
| WO | WO9501412 | 1/1995 |
| WO | WO9805700 | 12/1998 |

OTHER PUBLICATIONS

Organosilicone Surfactants as Adjuvants for Agrochemicals—Oeter J. G. Stevens.
Development of New Additives to Improve Scratch Resistance and Impart Slip to Solvent-Based Coatings Systems—Ferdinand Fink.
Basic Concepts in Reader Design and Ideal Reactors Models.

Primary Examiner—David W. Wu
Assistant Examiner—Caixia Lu
(74) Attorney, Agent, or Firm—Michael P. Dilworth

(57) ABSTRACT

Disclosed is a continuous process for producing silicone copolymer using a series of at least one stirred-tank reactor the last of which feeds into at least one plug flow reactor, wherein the crude product stream exiting the last of said stirred-tank reactors is sufficiently homogeneous that the stream which undergoes further reaction in the plug flow reactor does not undergo phase separation.

10 Claims, 1 Drawing Sheet

CONTINUOUS MANUFACTURE OF SILICONE COPOLYMERS

The present application is a divisional of U.S. patent application Ser. No. 09/053,291, filed Apr. 1, 1998, now U.S. Pat. No. 5,986,022.

FIELD OF THE INVENTION

The present invention relates to a process for the continuous production of silicone copolymes, and to the novel products produced by the process.

BACKGROUND OF THE INVENTION

Silicone copolymers serve as surface-tension lowering agents in agricultural adjuvants, stabilizers for polyurethane foam, additives for coatings applications, antifoams, and emulsifiers. The efficient manufacture of silicone copolymers is desired for two primary reasons—lower cost, and less waste. If, in addition, the equipment needed for that method or process is less costly to construct, such method or process would be inherently attractive. Moreover, there remains a need for a process to prepare silicone copolymers that provides desirable properties in the application for which they are intended, which process would offer manufacturers the flexibility to produce variations of products, determined by the choice of method of manufacture.

Chemical reactions may be conducted in a batch fashion, in a continuous fashion, or in hybrid fashion (partially batch or partially continuous). For example, the reactants necessary to prepare a silicone copolymer may be a silicone fluid containing one or more hydrogen atoms directly bonded to silicon (hereafter referred to as a hydrogen siloxane or SiH fluid); and an olefinically terminated compound (hereinafter referred to as an olefinic compound). The two components are mixed together in appropriate amounts, and while being sufficiently agitated, catalyst is added. A vigorous reaction ensues, and the olefin, by hydrosilation, becomes chemically attached to the silicone.

Because in most cases the hydrogen siloxane fluid and the olefinic compound are immiscible, a compatibilizing agent frequently is used to facilitate reaction. This agent is often called a solvent, although it is not necessary to use it in sufficient quantity to dissolve both components. If the hydrogen siloxane fluid and olefinic compound are sufficiently pure of minor-to-trace components, the amount of "solvent" can be decreased, in some cases to zero. However, in those cases, good agitation becomes even more important, to maximize the contact between the two (relatively) immiscible phases.

The reaction between the raw materials need not be conducted in a purely batch fashion. For example, if the reactivity of the hydrogen siloxane fluid is very high, the olefinic compound may be charged to the reactor in its entirety, a fraction of the hydrogen siloxane fluid may be charged, the reaction catalyzed by adding a noble metal catalyst solution, and the remaining hydrogen siloxane fluid added subsequently and at such a rate, after the initial reaction exotherm has begun to subside, as to keep the reaction under control. This process is sometimes called semi-batch, or (incorrectly) semi-continuous. If both the hydrogen siloxane fluid and the olefinic compound are added only in part initially, and then all components added continuously after the reaction is initiated, and added until the reactor is full, the reaction is called (correctly) semi-continuous.

Truly continuous reaction of hydrogen siloxane fluid and olefin has, heretofore, not been successfully accomplished. This is for several reasons, which will be enumerated in detail.

There are two main types of continuous reactors for liquid phase systems: continuous stirred tank reactors (known as CSTRs); and plug-flow reactors. In CSTRs, it is inherent that not all of any of the reactants can be consumed completely. However, silicone copolymer containing unreacted hydrogen siloxane fluid is unsuitable for making many commercial products. Thus, CSTRs themselves are not good for making silicone copolymer.

The presence of this unreacted hydrogen siloxane fluid exiting a CSTR reaction might be circumvented by the use of a plug flow reactor; however, without the continual mixing of the CSTR the immiscible hydrogen siloxane fluid and olefinic compound will phase-separate very rapidly subsequent to initial mixing, thus causing the reaction to proceed more and more slowly. In fact, the reaction ceases rapidly without ongoing agitation, and then fails to proceed, even upon renewed agitation, which effect is believed to be caused by gradual, irreversible deactivation of the catalyst. Thus, neither of the two standard continuous reactor systems alone is effective for the manufacture of silicone copolymers.

BRIEF SUMMARY OF THE INVENTION

Silicone copolymers exhibiting improved properties can be manufactured in continuous fashion by using a series of at least one CSTR followed by at least one plug flow reactor. It has been found that the silicone copolymers produced in this continuous fashion may have certain properties markedly different from those of analogous copolymers produced in batch fashion.

Thus, a process for producing silicone copolymers is taught having the steps of, (a) continuously feeding hydrogen siloxane, olefinically substituted compound capable of reacting with said hydrogen siloxane, and catalyst for said reaction, to at least one (1) CSTR in series and continuously withdrawing from the last CSTR in said series a crude product stream that contains silicone copolymer and unreacted hydrogen siloxane and olefinic compound, provided that said hydrogen siloxane and said olefinic compound are reacted in said series of CSTRs to a sufficient extent that said crude product stream is sufficiently homogeneous that it does not undergo phase separation in step (b), and (b) continuously feeding said crude product stream to at least one plug flow reactor from which product is withdrawn.

DETAILED DESCRIPTION OF THE INVENTION

Figure 1:
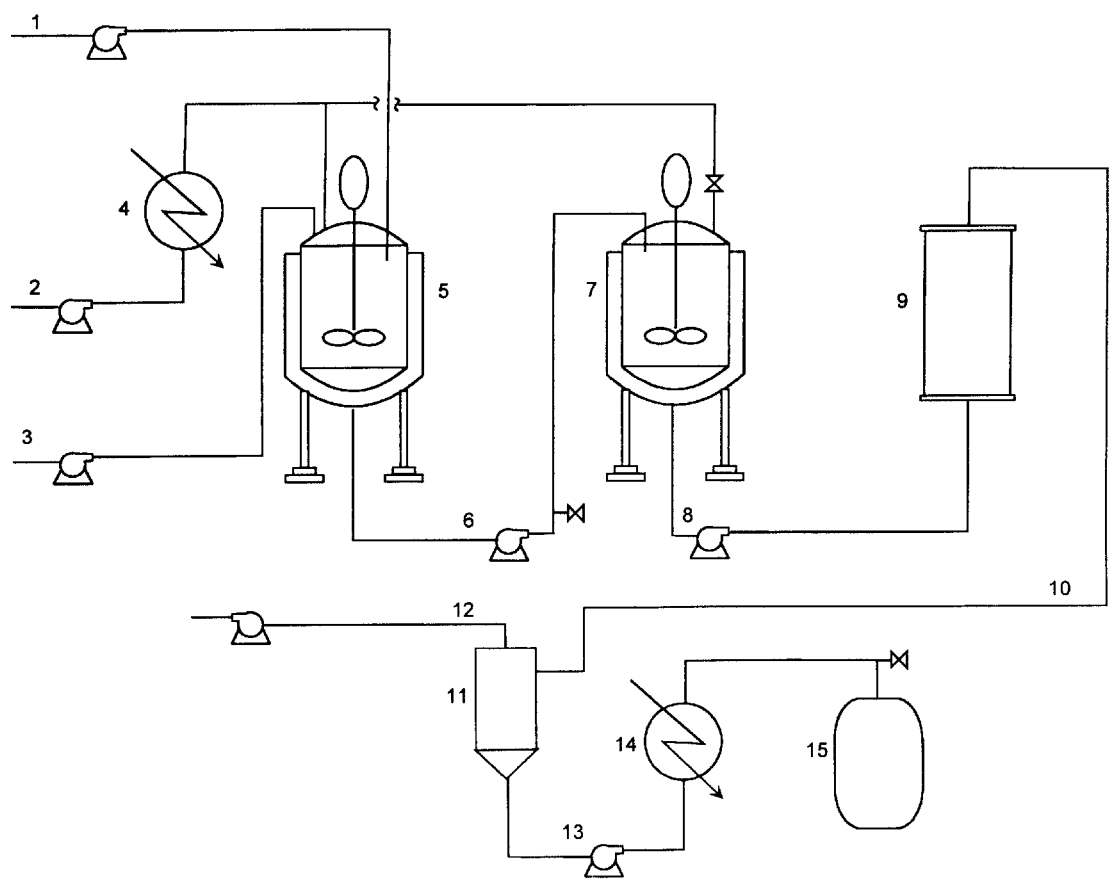
FIG. 1 is an exemplary production system for the manufacture of silicone copolymers.

Continuous systems are smaller than batch reactor systems, are less costly, contain less product, are easier to clean, generate less waste (if cleaning is implemented between using the reactor system to make two different products), and less material is lost from equipment "holdup", so overall efficiency is higher. From an operating perspective, continuous systems are also more "controllable", in the sense that the extent or degree of reaction primarily is determined by the reactor or equipment design, as opposed to elapsed time.

Neither a CSTR nor a plug-flow reactor, alone, provides for continuous manufacture of suitable silicone copolymers;

however, when used in combination, the reactor system of the present invention is surprisingly effective at driving the reaction to completion, without undergoing the phenomenon of phase separation, and the resultant copolymer provides unanticipated additional benefits.

Reactant

The present invention is applicable to any hydrosilation reaction, typically catalyzed, between a hydrogen siloxane (or SiH fluid) and an olefinically unsaturated compound (hereinafter referred to as olefinic compound). The hydrogen siloxane can be an organohydrogensiloxane comprising any combination of siloxane units selected from the group consisting of $R_3SiO_{1/2}$, $R_2HSiO_{1/2}$, $R_2SiO_{2/2}$, $RHSiO_{2/2}$, $SiO_{4/2}$, $HSiO_{3/2}$ and $RSiO_{3/2}$, provided that the hydrogen siloxane contains sufficient R-containing siloxane units to provide an average from 1.0 to 3.0 R radicals per silicon atom and sufficient H-containing siloxane units to provide from 0.01 to 1.0 silicon-bonded hydrogen atoms per silicon atom and a total of R radicals and silicon-bonded hydrogen atoms of from 1.5 to 3.0 per silicon atom.

Alternatively, wherein $M=(R)_3SiO_{1/2}$, $M'=(R)_2HSiO_{1/2}$, $D=(R)_2SiO$, $D'=(R)HSiO$, and x and y are integers, the preferable structures of the SiH fluid would be $MD_xD'_yM$ wherein x and y are in the respective ranges of $0 \leq x < 160$, $1 \leq y < 40$, and $1 \leq x+y < 200$, and $MD_xD'_yM'$ or $M'D_xD'_yM'$ wherein x and y are in the respective ranges of $0 \leq x \leq 160$, $0 \leq y \leq 40$ and $x+y \leq 200$. The polymer formulae given here and elsewhere herein, such as $MD_xD'_yM$, are to be understood as representing the average compositions of statistical polymers, unless otherwise noted. Some preferred SiH fluids are MD'M and M'D'M' trisiloxanes.

Each R group is independently the same or different and each represents a hydrocarbon radical or an alkoxy or polyalkyleneoxy radical. Illustrative of suitable R radicals are $C_1$ to $C_{12}$ alkyl radicals (such as methyl, ethyl, propyl, butyl, isopentyl, n-hexyl, and decyl); cycloaliphatic radicals containing 5 to 12 carbon atoms (such as cyclohexyl and cyclooctyl); aralkyl radicals (such as phenylethyl); and aryl radicals (such as phenyl optionally substituted with 1 to 6 alkyl groups of up to 6 carbon atoms, such as tolyl and xylyl). Also illustrative R radicals are $C_1$ to $C_{12}$ alkoxyl radicals such as methoxy, ethoxy, propoxy, butoxy, and decyloxy; and polyalkyleneoxy radicals such as $CH_3O(CH_2CH_2O)_a(CH_2CH(CH_3)O)_b-$, in which the subscripts a and b may vary from 0 to about 200 and a+b>0. The preferred R radical is methyl.

The SiH fluids are typically fluids with a hydrogen content (measured by reaction with aqueous strong base to liberate hydrogen gas) of from about 5 cc/g to about 334 cc/g. The viscosities of the fluids can range from less than 1 cstk (centistoke) to greater than 300 cstk (25° C.). The structures of these fluids range from pure monomer, such as 1,1,2,2-tetramethyldisiloxane (M'M') to polymeric equilibrated fluid having a structure of $MD_{150}D'_{10}M$. Dimethylhydrogensiloxy-endblocked siloxanes may also be used to prepare linear block copolymers, sometimes referred to as $(AB)_n$ structures. The SiH fluids may be blends of different molecular weight and molecular structure fluids. There appears to be no limit to the structure of the hydrogen siloxane other than that imposed by handling (practical) aspects such as viscosity, and the desired properties of the copolymer product.

The reactive substituent is an olefinically substituted moiety. Preferably, the olefinic compound is a polyoxyalkylene reactant corresponding to the formula $R^1(OC_aH_{2a})_nOR^2$, it being understood that the polyoxyalkylene moiety can be a block or random copolymer of oxyethylene, oxypropylene or oxybutylene units and is typically a blend of molecules of varying chain lengths and compositions. In the foregoing formula, a is 2 to 4 for each unit, n is 1 to 200, $R^1$ denotes an alkenyl group (preferably an alpha-olefinic group) containing 3 to 10 carbon atoms and most preferably an allyl or methallyl group; and $R^2$ denotes a monovalent radical, preferably hydrogen, an alkyl group containing 1 to 5 carbon atoms, an acyl group containing 2 to 5 carbon atoms, a 2-oxacycloalkyl group of 4 to 6 carbon atoms, or a trialkylsilyl group. Alternatively, if it is desired to prepare an $(AB)_n$ type copolymer, $R^2$ may be an alkenyl group (preferably an alpha-olefinic group) containing 2 to 10 carbon atoms, and most preferably an allyl or methallyl group.

Structures of the preferred olefinically unsaturated polyether reactant used can typically range from polyalkyleneoxide monoallyl ether of nominal molecular weight 204 Daltons, all-ethylene oxide; to 8000 Daltons, 40% ethylene oxide, 60% propylene oxide; to 1500 Daltons all-propylene oxide or to 1500 Daltons all-butylene oxide. Whether the polyether is capped (e.g., a methyl allyl ether) or uncapped (e.g. a monoallyl ether) is immaterial. If the polyether is uncapped, it is preferred that an appropriate buffering agent be present, such as any of those disclosed in U.S. Pat. No. 4,847,398, the disclosure of which is hereby incorporated herein by reference.

Other olefinically unsaturated olefinic compounds useful herein are an olefin-started alkane e.g., 1-octene, 1-hexene, ethylene, vinylcyclohexane), an olefin-started alcohol, an olefin-substituted epoxide (e.g., allyl glycidyl ether, or vinylcyclohexene monoxide), a vinyl-substituted alkylamine, a halogenated olefin-started alkane, allyl methacrylate, a vinyl-started nitrile (e.g., acrylonitrile) or an acetylenically unsaturated material (e.g., butyne diol). Other specific examples include 4-methyl-1-pentene, styrene, or eugenol.

Multiple olefinic compounds may be used on one copolymer. For example, ethylene is sometimes used with an allyl-polyether to improve compatibility as a polyurethane foam surfactant; vinylcyclohexene monoxide is used as a co-reactant with allyl-polyether to form a terpolymer used in textile softening; and eugenol and a polyether are used with a hydrogen siloxane fluid to produce a diesel fuel antifoam copolymer.

The reactants preferably are purified and dried. No compatibilizing agent or "solvent", is needed, but low levels may be added without compromising the effectiveness of the process. However, in that case, a solvent stripping system would need to be incorporated; or the solvent would remain in the copolymer product.

As previously indicated, the hydrosilation reaction is conducted in the presence of a hydrosilation catalyst, preferably containing a noble metal. Thus, the hydrosilation reaction between the hydrogen siloxane and the olefinically unsaturated reactant is facilitated by using catalytic amounts (or effective amounts) of a noble metal-containing catalyst. Such catalysts are well known and include platinum, palladium and rhodium-containing compounds. They are reviewed in the compendium, *Comprehensive Handbook on Hydrosilylation*, edited by B. Marciniec and published by Pergamon Press, NY 1992. In general, platinum catalysts are preferred, and chloroplatinic acid and the platinum complexes of 1,3-divinyltetramethyldisiloxane are particularly preferred.

The catalyst is employed in an effective amount sufficient to initiate, sustain and complete the hydrosilation reaction. The amount of catalyst is usually within the range of from about 1 to about 100 parts per million (ppm) of noble metal, based on the total parts of the mixture of reactants and solvent. Catalyst concentrations of 2–20 ppm are preferred.

The hydrosilation reaction optionally can be conducted in the presence of additives (or "buffering" agents) such as the carboxylic acid salts disclosed in U.S. Pat. No. 4,847,398. In that patent, the use of "buffering" salts is disclosed, which salts have the effect of preventing the dehydrocondensation of hydroxyl groups with the SiH moiety. The salt preferably is predissolved in the polyether, prior to introduction into the CSTR. The concentration used, the salt or other buffer selected, and the effects expected are process specific.

The hydrosilation reaction optionally can be carried out in the presence of the sterically hindered nitrogen compounds disclosed in U.S. Pat. No. 5,191,103, or the phosphate salts disclosed in U.S. Pat. No. 5,159,096. Depending on the method of manufacture, and on the nature of the reactants, one or more of these additives may be present during the hydrosilation reaction. For example, a low, but sometimes adequate, level of carboxylic acid salts or phosphate salts already may be present in olefinically substituted polyoxyalkylenes following capping of hydroxyl-terminated allyl-started polyoxyalkylenes with allylic, methallylic, methyl or acyl groups, or due to neutralization of basic catalysts with phosphoric acid. In such instances, the use of additional salt or other additive may not be necessary to achieve the desired effect.

One potential product is a silicone polymer of the structure $M^*D_xD^*_yM^*$,
wherein $M^*$ is $SiO_{1/2}(CH_3)_2R^*$ or $O_{1/2}Si(CH_3)_3$;

D is as above;

$D^*$ is $SiO_{2/2}(CH_3)R^*$;

$R^*$ is derived from the olefinic compound discussed above by addition of an Si—H bond across an olefin moiety of the olefinic compound, wherein each $R^*$ may be the same or different; and x and y are as above.

Alternatively if an $[AB]_n$ type copolymer is produced, it will be of the structure $[-B-[SiO(CH_3)_2]_n-]_m$ wherein B is the substituent (except derived from a di-olefin or similar di-functional starting material), n is 1 to 500 and m is 2 to 500. Moreover, variations on the above structures, e.g., using cyclic siloxanes or using branched siloxanes containing $SiO_{4/2}$, $SiHO_{3/2}$, or $Si(CH_3)O_{3/2}$ groups, may be produced.

Equipment

The present invention is carried out using at least one, and preferably two, CSTRs connected in series. These can be of any conventional design effective to carry out the desired reaction. Each is equipped with inlet for the reactants, outlet for the product stream, and agitator. The outlet of the last stirred tank reactor in the series is connected to the inlet of a plug flow reactor which also can be of any conventional design effective to carry out the desired reaction. The term plug flow reactor includes the functional equivalent thereof which may be a series of CSTRs, though a plug flow reactor is preferred. See Hill, *An Introduction to Chemical Engineering Kinetics and Reactor Design,* pp. 279–299 (1977), which is incorporated herein by reference.

The number of CSTRs will depend somewhat on the identity of the particular reactants and on the desired rate of throughput. For some cases, it has been found that one CSTR is sufficient, e.g., trisiloxane fluids. For most reactions, formation of the desired silicone copolymer proceeds at a rate such that two CSTRs are needed. In other reactions, three or even four (and rarely, more) CSTRs are needed. The number of CSTRs needed is related generally to the "clear point" of a batch reaction of the reactants, as discussed below. In any case, the outlet of the first CSTR feeds directly to the inlet of the second CSTR, the outlet of the second CSTR feeds directly to the inlet of the third CSTR if one is present, and so on.

The design of the CSTRs and plug flow reactors is well-known in the art, and is summarized, for example in "An Introduction to Chemical Engineering Kinetics and Reactor Design" John Wiley & Sons, NY, 1977, pages 245–304.

With reference to the FIGURE, there is an hydrogen siloxane fluid feed line 1, an olefinic compound feed line 2 and a catalyst feed line 3. It is preferred to pre-heat the olefinic compound in a heat exchanger 4. There is a first CSTR 5, which has a product withdrawal stream 6, which feeds to an optionally present second CSTR 7. The exit stream of the second CSTR 8 feeds to a plug flow reactor 9, which feeds 10 to a product separator 11. The light products are withdrawn 12 while the heavy products 13 are cooled in a heat exchanger 14. Final copolymer product may be collected in storage 15.

Operation

At steady state, the reactants are fed continuously to at least the first CSTR in the series. Catalyst also can be fed continuously, or intermittently. As will be described more fully below, one or both reactants and/or additional catalyst also can be fed to the second and/or successive CSTRs. Preferably, the total amount of the olefinic compound(s) fed to the process represents a stoichiometric excess based on the total amount of hydrogen siloxane fed, since it is preferred that the silicone copolymer product contain no more than a trace amount of unreacted hydrogen siloxane (i.e., less than 0.1 cc/g hydrogen content, as described above), and preferably no unreacted hydrogen siloxane at all.

The stream that exits the first CSTR and enters the second CSTR (if used) contains reaction product(s), or partial reaction product(s) (i.e., molecules still containing some SiH moieties), unreacted hydrogen siloxane and olefin, and amounts of catalyst, and the reaction thereof continues in the second CSTR. If the residence time in the series of CSTRs is prolonged, the catalyst may no longer be active when the reaction mixture enters the plug flow reactor. The time required for this to occur is dependent on variables such as the identity and the purity of the olefinic compound, and is thus peculiar to every individual reaction system. In general, however, it is desirable to have not less than 50% by weight, and no greater than 90% by weight of the limiting reagent reacted in any given CSTR. The remainder of the reaction will be completed in the plug flow reactor. Additional catalyst optionally can be added after the first CSTR, i.e., to the second, or optionally third or later, CSTRs, to accomplish a greater degree of reaction.

In a preferred embodiment, the reaction proceeds in the series of CSTRs to such an extent that the stream (termed the "crude product stream") exiting the last CSTR is homogeneous. The crude product stream is considered to be sufficiently homogeneous if it does not undergo phase separation as it continues to react under laminar flow conditions in the plug flow reactor. It has been found, quite surprisingly, that this degree of homogeneity can be achieved in the series of CSTRs in spite of the incompatible natures of the hydrogen siloxane and the reactive olefinic compound reactants, and in spite of the fact that there may be residual amounts of unreacted silanic 89601 hydrogen and olefinic compound in even the last of a series of two or more CSTRs. It has also been found, all the more surprisingly, that even if it is visibly cloudy when it exits the last CSTR, the crude product stream does retain its homogeneity through the plug flow reactor without undergoing the phase separation.

The point at which the crude product reaches homogeneity often corresponds to about 60–75%, conversion, though sometimes lower, of the hydrogen siloxane to silicone copolymer. This point is sometimes referred to as the "clear point".

The number of CSTRs required in the series generally is related to the clear point of a batch reaction conducted on the same reactants as will be used in the continuous process of the present invention. If the clear point occurs at less than 50% reaction, a single CSTR in the series may suffice. However, for general processing of a variety of copolymers, a series of at least two CSTRs is preferred, to achieve the degree of homogeneity described above. In those cases where the clear point occurs at greater than 90% reaction, a third CSTR may be required. If staged addition, described below, is used, then a third reactor may be required. However, unless staged addition is desired, a third reactor is not generally required. By decreasing the flow rates to the first CSTR, a third CSTR may be avoided; but because of phase separation which will occur prior to the clear point, it is preferable to use a second CSTR.

To help ensure that the product stream has passed the clear point, it is preferred to carry out the reaction in the series of CSTRs under conditions such that the stream that exits the next-to-last tank of the series is visibly homogeneous. As noted, the stream still contains unreacted material and so continues to react in the last CSTR even after having attained homogeneity.

Since catalyst deactivation proceeds rapidly at the end of the reaction, and because in an idealized CSTR some unreacted components are always present in the exiting mixture, it is preferred that the completion of reaction occur in the plug flow portion of the system. Thus, the crude product stream does not need to have been taken exhaustively to completion of the reaction in the CSTR series to form silicone copolymer.

The plug flow reactor should have a flow rate such that there is laminar flow therein. The space time ($\tau$), and therefore reactor size, of the reactor depends on the catalyst concentration used. The temperature should be the same as or higher than that in the last CSTR.

Thus, in one embodiment of the invention, a polyether or olefin, or both, and a hydrogen siloxane fluid are metered into a first CSTR, and the temperature of the contents is raised to and maintained at between 45° C. and 135° C. When the first CSTR is half-to-completely full, flow of the hydrogen siloxane fluid, polyether and olefinic compound is stopped, and catalyst is added rapidly, a large enough aliquot initially to take the entire contents to the desired concentration of noble metal or other active catalytic species, and afterwards sufficient only to maintain that concentration. After catalyst addition, an exotherm is observed in the first CSTR. After the temperature has achieved the desired set point, flow is begun again of the catalyst, hydrogen siloxane fluid, and olefinic compound(s) into the reactor, and at the same or a later time, flow begins out of the first CSTR optionally into a second CSTR of same or similar size. The second CSTR is maintained at an effective reaction temperature, usually the same as or higher than the first, but preferably within 25° C. of the temperature in the first CSTR. Once the second CSTR is full, flow is begun optionally in the same manner through a third and optionally subsequent CSTR(s), or preferably directly to a rising plug flow reactor of volume equal to or greater than the prior CSTR, and maintained within the same temperature range, usually the same as or hotter than the second CSTR. Once the plug-flow reactor is full, optionally flow begins to a conventional stripping unit to remove trace volatiles, reducing odor and flammability, or the product can be collected and further processed, as for example, by filtration or stripping elsewhere, if needed. The copolymer exiting the plug flow reactor does not require any further reaction to be suitable for use.

If a third CSTR is used, it is first filled, and then the flow exits to the plug flow reactor, as described above. A third CSTR can help obtain phase compatibilization by vigorous mechanical agitation for a longer period, or to allow further reaction completion if staged addition (discussed below) is employed in the second CSTR. The need for a third CSTR will become apparent if a sample of the reaction mixture exiting the second CSTR shows evidence of phase separation—for example, the development of two distinct phases; or if, upon centrifugation to remove air bubbles, the sample remains hazy.

In a preferred embodiment of the reactor system, recirculating loops are provided between the exit of the first CSTR, back to the inflow, and from the exit of the second CSTR (if used), back to the inflow of the first CSTR. Such a recycle stream may be used during startup, to reduce reactor size requirements, or to return product to an earlier CSTR in the series. Thus, an infrared or other monitor senses whether the remaining content of hydrogen bound to silicon of the outflow of the second CSTR is above a tolerable level, and if so the outflow can be partially or fully recycled back to the first CSTR, which prevents any phase separation occurring in the plug-flow reactor. The recycle loop from the outflow of the first CSTR back to the inflow can be monitored by an IR detector also, but is not routinely used in this fashion. Rather, it is used during start-up to ensure that reaction has progressed sufficiently before filling the second CSTR.

In the most preferred embodiment, a third CSTR is required only if staged addition (described below) is practiced.

In the present invention, consistent introduction of a second olefinic compound easily is accomplished: it can be added to the second CSTR. Because this second component is not present in the first CSTR, reaction in the first CSTR must occur only between the hydrogen siloxane fluid and the first olefinic compound. Upon entering the second CSTR, the second olefinic compound is available to react with the hydrogen siloxane fluid, along with any unreacted first olefinic compound. Of course, it is not necessary to add either olefinic compound exclusively to one CSTR; they may be fed to two or more CSTRs in different ratios. If staged addition is used, it generally is preferred not to add any additional reactants to the last in the series of CSTRs. Thus, in a three-CSTR configuration reactants would be added to the first and the second CSTRs, in the proportions desired, but not to the third CSTR; the hydrosilation reaction can thus be effectively extended to the degree of homogeneity required (as discussed above).

Likewise, it becomes apparent that a second, different hydrogen siloxane fluid can be introduced in similar staged fashion. In fact, any combination of reactants can be combined in staged fashion, and silicone copolymer product can be obtained much more reproducibly and consistently than could be accomplished in a batch mode, unless the desired products could be obtained in separate batch reactions and then combined after the reactions are complete.

The copolymers of the present invention may be used as surfactants, antifoams, agricultural adjuvants, textile finishes, reactive dilvents, coating additives, wetting agents, hydrophobizing agents, inter alia, as will be clear to one of skill in the art.

Some of the copolymers produced by the above-described process can be unique, and can differ significantly in their properties from copolymers made from the same reactants in batch processes. One manner in which this uniqueness appears is in the performance of the copolymer in production of polyurethane foam. Silicone copolymers made according to the present invention can be used in the production of polyurethane foam in the same manner as for known silicone copolymer surfactants. Thus, a foamable mixture is formed comprising a polyol component, a polyisocyanate, one or more catalysts, an optional auxiliary blowing agent, and the silicone copolymer surfactant. The composition is reacted to produce the polyurethane foam.

In comparison to batch-produced copolymer, a continuously produced copolymer can afford flexible polyurethane foam that has a much greater open-cell content. With copolymer made by the continuous process, there appears to be a wider range of potency vis-à-vis breathability (facility of air flow through the foam); the foam made with this copolymer remains soft and flexible throughout the surfactant molecular weight range that is practical based on other considerations such as viscosity.

Thus, by producing the copolymer in continuous fashion in accordance with the present invention, the manner of combination of the hydrogen siloxane fluid with the olefinic compound appears to have been unexpectedly altered, consistent with the observed change in breathability. This discovery, that the mode of synthesis of the copolymer affects breathability, provides the very significant advantage that the continuous process of the present invention—particularly as contrasted to batch mode—can be modified purposefully to cause any of a variety of desired copolymer structures. This aspect may be achieved by carrying out the process of the present invention using the embodiment referred to herein as "staged" addition of the reactants.

Continuous copolymer manufacture offers significant new opportunity to consistently vary the distribution of pendant groups on the copolymer, and thus "tailor" the properties to enhance the desired characteristics in the application. When using staged addition, a third CSTR is preferred, allowing a greater degree of reaction completion prior to the mixture entering the plug flow reactor. It is also preferred in such cases to add reactants to all of the CSTRs other than the last one.

EXAMPLES

Whereas the scope of the present invention is set forth in the appended claims, the following specific examples illustrate certain aspects of the present invention and, more particularly, point out methods of evaluating the same. It is to be understood, therefore, that the examples are set forth for illustration only and are not to be construed as limitations on the present invention. All parts and percentages are by weight unless otherwise specified.

The following test procedures were used to evaluate the products obtained in the examples.

Foam Test

Unless otherwise indicated in the Examples, the polyurethane foams were prepared according to the general procedure described in "Urethane Chemistry and Applications" K. N. Edwards, Ed., American Chemical Society Symposium Series No., 172, A.C.S., Washington, D.C. (1981) pg 130 and J. Cellular Plastics, November/–December 1981 pgs. 333–334. The basic steps in the procedures for mixing and foaming of blown polyurethane foam on a laboratory scale are:

1. The formulation ingredients are weighed and made ready to be added in the predetermined sequence to the mixing container.
2. The formulation ingredients (with the exception of polyisocyanate) are mixed intensively, and allowed to "degas" for a prescribed time; an auxiliary blowing agent, other than water, may be added (if such auxiliary agent is used) prior to mixing.
3. Polyisocyanate is added and the formulation is mixed again. The mixed formulation is poured quickly into an open-topped container such as an open-topped disposable plastic pail for slab foam and the foam is allowed to rise.
4. After the rise is complete, the foam is allowed to stand from the time the mixing procedure began a total of 3 minutes, and is then post-cured in an oven at 115° C. for fifteen minutes. Foam Cell uniformity (Table 1 ST) is judged by the structure of the foam where a "1" rating has small uniform cell structure and a "14" has large non-uniform coarse cell structure. Foams were evaluated in duplicate and values averaged. Urethane foam Air Flow (Table 1, AF) are obtained utilizing a NOPCO instrument on a horizontal ½ inch (1.27 cm) thick cut of foam obtained three inches from the bottom of the foam bun. The Porosity of the foam is measured in $ft^3$/min of air flow through the ½ inch (1.27 cm) thick cut of foam.

Cloud Point

Cloud point is a measurement of water solubility and as used herein is the temperature at which a silicone polyether copolymer, for example, begins to precipitate out of a 1% copolymer/99% water solution. The higher the cloud point the more prolonged (as temperature increases) the water solubility.

Cloud Point was determined as follows: A 1-gram of sample was dissolved in 99 ml of distilled water in a 150 ml beaker. A 1 inch (2.54 cm) plastic coated stirrer bar was inserted in the beaker, and the beaker was placed on a combination stirrer/hot plate. A 0 to 100° C. thermometer was suspended in the solution with the bulb ½ inch (1.27 cm) from the bottom of the beaker. With mild stirring, the contents of the beaker were heated at the rate of 1 to 2° C. per minute. The temperature at which the submerged portion of the thermometer was no longer visible was recorded.

Viscosity

Viscosity was determined at 25° C., using a calibrated Ostwald viscometer which gives an efflux time of approximately 100 seconds. The measurements are repeated until the efflux time readings agree within 0.1 seconds. Calculations are determined by the equation: E×F=Viscosity (cstk), where E=Efflux time in seconds; F=Calibration factor.

EXAMPLES

Examples 1–3 are comparative examples in which the method of preparation utilizes a batch hydrosilation process. Examples 4–6 below, demonstrate the production of Copolymers employing a Continuous hydrosilation process utilizing two continuous stirred reactors followed by a plug flow reactor in series. Example 1 (batch) and Example 4 (continuous) utilizes the same raw materials in the same stoichiometric ratios. The olefinically substituted polyether is uncapped and possesses hydroxyl functionality. This material is used in cosmetic formulations in which higher water solubilities and higher cloud points are desirable.

Example 2 (batch) and Example 5 (continuous) utilize the same raw materials in the same stoichiometric ratios. These examples utilize olefinically substituted polyethers which are methyl terminated. These products are used in flexible polyurethane foam formulations in which good uniform cell structure and open (as measured by higher air flow) cell structure is important.

Example 3 (batch) and Example 6 (continuous) utilize the same raw materials in the same stoichiometric ratios. These examples teach utilizing olefinically substituted polyethers which are Acetoxy terminated. These products are also used in flexible polyurethane foam formulations and as noted good uniform open cell structure is desirable.

List of Materials and Abbreviations $M=(CH_3)_3SiO_{1/2}$, $D=(CH_3)_2SiO$, and $D'=CH_3(H)SiO$ 40HA1500-OMe=methyl capped allyl random polyether with 40 wt % ethylene oxide (EO)/60 wt % propylene oxide (PO)—1500 Daltons number average molecular weight (mw)

40HA4000-OMe=methyl capped allyl random polyether with 40 wt % ethylene oxide (EO)/60 wt % propylene oxide (PO)—4000 Daltons mw 40HA1500-OAc=Acetoxy-capped allyl random polyether with 40 wt % ethylene oxide (EO)/60 wt % propylene oxide (PO)—1500 Daltons mw 40HA4000-OAc=Acetoxy-capped allyl random polyether with 40 wt % ethylene oxide (EO)/60 wt % propylene oxide (PO)—4000 Daltons mw Example 1

(Comparative)

To a 4-necked, round bottom flask, equipped with a stirrer, Friedrich condenser, a temperature-controller and a sparge tube the following materials were charged: 133.3 grams of allyloxypolyethylene glycol (APEG) (385 mw), 66.8 grams of equilibrated methyl hydrogen polysiloxane fluid having a nominal structure of $MD_{15}D'_6M$, 0.09 grams (500 ppm) sodium propionate. The flask contents were agitated and heated to 85° C. reaction temperature with a light nitrogen sparge. At the 85° C. temperature, heating and nitrogen sparge were stopped and the reaction was catalyzed with 0.28 cc of 3.3% chloroplatinic acid solution in ethanol (15 ppm Pt). Within 30 minutes the reaction exothermed and the flask temperature peaked at 117° C. This one-pot batch reaction produced a clear haze-free product of 344 cstk and afforded an aqueous cloud point of 50° C. No residual Silanic hydrogen was detected in the product.

Example 2

(Comparative)

To a 4-necked, round bottom flask, equipped with a stirrer, Friedrich condenser, a temperature-controller and a sparge tube the following materials were charged: 72.7 grams of 40HA1500-OMe, 75.3 grams of 40HA4000-OMe, 52.0 grams of equilibrated methyl hydrogen polysiloxane fluid having a nominal structure of $MD_{70}D'_5M$. The flask contents were agitated and heated to 85° C. reaction temperature with a light nitrogen sparge. At the 85° C. temperature, heating and nitrogen sparge were stopped and the reaction was catalyzed with 0.29 cc of 3.3% chloroplatinic acid solution in ethanol (15 ppm Pt). Within 35 minutes the reaction exothermed and the flask temperature peaked at 94° C. This one-pot batch reaction produced a clear haze-free product of 1821 cstk and afforded an aqueous cloud point of 37° C. No residual silanic hydrogen was detected in the product.

Example 3

(Comparative)

To a 4-necked, round bottom flask, equipped with a stirrer, Friedrich condenser, a temperature-controller and a sparge tube the following materials were charged: 73.45 grams of 40HA1500-OAc, 76.15 grams of 40HA4000-OAc, 50.4 grams of equilibrated methyl hydrogen polysiloxane fluid having a nominal structure of $MD_{70}D'_5M$. The flask contents were agitated and heated to 80° C. reaction temperature with a light nitrogen sparge. At the 80° C. temperature, heating and nitrogen sparge were stopped and the reaction was catalyzed with 0.29 cc of 3.3% chloroplatinic acid solution in ethanol (15 ppm Pt). Within 15 minutes the reaction exothermed and the flask temperature peaked at 81° C. This one-pot batch reaction produced a clear haze-free product of 3328 cstk and afforded an aqueous cloud point of 36° C. No residual silanic hydrogen was detected in the product.

Example 4

In a steady state operation, 1333.4 grams/hour of allyloxypolyethylene glycol (APEG, 385 mw, containing 500 ppm sodium propionate suspended, same lot of material used in Example 1) was fed into the first continuous stirred reactor 5 apparatus shown in the FIGURE through pipeline 2 and 667.5 grams/hour of equilibrated methyl hydrogen polysiloxane fluid having a nominal structure of $MD_{15}D'_6M$ (same lot as used in Example #1), was fed in over pipeline 1. The temperature of the allyloxypolyethylene glycol being fed through pipeline 2 was maintained about 85° C. and the organohydrogenpolysiloxane fluid through pipeline 1 about 28° C. The agitated reaction in the first CSTR 5 was catalyzed continuously with a 1% chloroplatinic acid solution in ethanol at a rate of 9.9 ml/hour which afforded a constant concentration of 15 ppm of platinum in the first CSTR 5 through pipeline 3. Because of the continuous hydrosilation reaction exotherm, the CSTR 5 was maintained at a constant temperature of approximately 85–90° C. by the use of an external jacket on the first CSTR 5 that could add or remove heat. The reaction mixture was pumped out of the first CSTR 5 at the same rate at which it entered the first CSTR 5 (2010.8 grams/hour) through pipeline 6 and into a second CSTR 7. The temperature in the second CSTR 7 was maintained at 85–90° C. by the use of an external heated or cooled jacket on the second CSTR 7. The reaction mixture left the second stirred reactor with a temperature of 85–90° C. through pipeline 8 as a homogenous clear liquid at a rate of 2010.8 grams/hour and entered the plug flow reactor 9. The heating and cooling mantle of the plug flow reactor 9 was controlled so that the reaction mixture, emerging through pipeline 10, had a temperature of 85–90° C. The average residence time in the combined volume of the three reactors was 4.0 hours. The reaction product optionally was conveyed to a thin-film evaporator 11 in which the product was devolatilized under reduced pressure. The resulting product was cooled to <50° C. in a heat exchanger 14 and optionally filtered (not shown) to product storage 15 via pipeline 13. The copolymer product thus prepared was a clear haze-free liquid affording a viscosity of 332 cstk and an aqueous cloud point of 57° C. No residual silanic hydrogen was detected in the product.

Example 5

In a steady state operation, 2956.8 grams/hours of a homogenous mixture composed of 49.1 weight percent 40HA1500-OMe and 50.9 weight percent 40HA4000-OMe (same lots of material used in Example 2) was fed into the first continuous stirred reactor (CSTR 1) apparatus shown in the FIGURE through pipeline 2 and 1040.2 grams/hour of equilibrated methyl hydrogen polysiloxane fluid having a nominal structure of $MD_{70}D'_5M$, (same lot as used in Example #2) was fed in over pipeline 1. The temperature of the allyloxypoly(oxyethylene)(oxypolypropylene) being fed through pipeline 2 was maintained about 85° C. and the methyl hydrogen polysiloxane fluid of pipeline 1 about 28° C. The agitated reaction in the first CSTR 5 was catalyzed continuously with a 1% chloroplatinic acid solution in ethanol at a rate of 33 ml/hour which afforded a constant concentration of 25 ppm of platinum in the first CSTR 5 through pipeline 3. Because of the continuous hydrosilation reaction exotherm, the first CSTR 5 was maintained at a constant temperature of approximately 85–90° C. by the use of an external jacket on the first CSTR 5 that could add or remove heat. The reaction mixture was pumped out of the first CSTR 5 at the same rate at which the combined raw materials were entering (4030 grams/hour) through pipeline 6 and entered the second CSTR 7. The temperature of the second CSTR 7 was maintained at 85–90° C. by the use of an external heated and cooled jacket on the first CSTR 7. The reaction mixture left the second stirred reactor 7 with a temperature of 85–90° C. through pipeline 8 as a homogenous clear liquid at rate of 4030 grams/hour and entered the plug flow reactor 9. The heating and cooling mantle of the plug flow reactor 9 was controlled so that the reaction mixture, emerging through pipeline 10, had a temperature of 85–90° C. The average residence time of the reaction mixture was about 2.0 hours. The reaction product optionally was conveyed to a thin-film evaporator 11 in which it was devolatilized under reduced pressure. The resulting product was cooled to <50° C. in a heat exchanger 14 and optionally filtered (not shown) to product storage 15 via pipeline 13. The copolymer product thus prepared was a clear haze-free liquid affording a viscosity of 1867 cstk and an aqueous cloud-point of 38° C. No residual silanic hydrogen was detected in the product.

Example 6

In a steady state operation, 2993.3 grams/hours of a homogeneous mixture composed of 49.1 weight percent 40HA1500-OAc and 50.9 weight percent 40HA4000-OAc (same lots of material used in Example 3) was fed into the first continuous stirred reactor 5 apparatus shown in the FIGURE through pipeline 2 and 1008.5 grams/hour of equilibrated methyl hydrogen polysiloxane fluid having a nominal structure of $MD_{70}D'_5M$, (same lot as used in Example #3) was fed in over pipeline 1. The temperature of the allyloxypoly(oxyethylene)(oxypolypropylene) being fed through pipeline 2 was maintained about 85° C. and the methyl hydrogen polysiloxane fluid of pipeline 1 about 28° C. The agitated reaction in the first CSTR 5 was continuously catalyzed with a 1% chloroplatinic acid solution in ethanol at a rate of 33 ml/hour which afforded a constant concentration of 25 ppm of platinum in the first CSTR 5 through pipeline 3. Because of the continuous hydrosilation reaction exotherm, the first CSTR 5 was maintained at a constant temperature of approximately 85–90° C. by the use of an external jacket on the first CSFR 5 that could add or remove heat. The reaction mixture was pumped out of the first CSTR 5 at the same rate at which the combined raw materials are entering (4034.8 grams/hour) through pipeline 6 and enters the second CSTR 7. The temperature of the second CSTR 7 was maintained at 85–90° C. by the use of an external heated and cooled jacket on the second CSTR 7. The reaction mixture left the second stirred reactor 7 with a temperature of 85–90° C. through pipeline 8 as a homogeneous clear liquid at rate of 4034.8 grams/hour and entered the plug flow reactor 9. The heating and cooling mantle of the plug flow reactor 9 was controlled so that the reaction mixture, emerging through pipeline 10, had a temperature of 85–90° C. The average residence time of the reaction mixture was about 2.0 hours. The reaction product optionally was conveyed to a thin-film evaporator 11 in which it was devolatilized under reduced pressure. The resulting product was cooled to <50° C. in a heat exchanger 14 and optionally filtered (not shown) to product storage 15 via pipeline 13. The copolymer product thus prepared was a clear haze-free liquid affording a viscosity of 2822 cstk and an aqueous cloud point of 37° C. No residual silanic hydrogen was detected in the product.

These data show a more water soluble (by cloud point) copolymer is obtained by the continuous process which is beneficial for personal care applications. The copolymer made by the continuous process also produced more open cell foam than standard batch copolymers.

TABLE 1

| Example Number | Process Type | Polyether | Viscosity cstk | Cloud Point, ° C. | Application | Foam Test | | | |
|---|---|---|---|---|---|---|---|---|---|
| | | | | | | Conc pphp | Rise cm | AF ft³/sec | ST |
| 1 | Batch | APEG 350 | 344 | 50 | Personal Care | — | — | — | — |
| 4 | Continuous | APEG 350 | 332 | 57 | Personal Care | — | — | — | — |
| 2 | Batch | 40HA 1500/4000-OMe | 1821 | 37 | Urethane Foam | 0.5 | 36.8 | 7.9 | 6 |
| | | | | | | 0.8 | 39.0 | 5.9 | 6 |
| 5 | Continuous | 40HA 1500/4000-OMe | 1867 | 38 | Urethane Foam | 0.5 | 34.8 | 8.2 | 7 |
| | | | | | | 0.8 | 37.8 | 8.7 | 6 |
| 3 | Batch | 40HA 1500/4000-OAc | 3328 | 36 | Urethane Foam | 0.5 | 37.6 | 7.2 | 7 |
| | | | | | | 0.8 | 40.0 | 6.7 | 6 |
| 6 | Continuous | 40HA 1500/4000-OAc | 2822 | 37 | Urethane Foam | 0.5 | 34.8 | 8.8 | 5 |
| | | | | | | 0.8 | 37.8 | 9.3 | 5 |

What is claimed is:

1. A product made by a process comprising:
  (a) continuously feeding hydrogen siloxane, one or more olefinically substituted block or random polyoxyalkylene corresponding to the formula $R^1(OCH_2CH_2)_v(OCH_2CHR^3)_w$—$OR^2$ wherein $R^1$ denotes an alkenyl group containing 3 to 10 carbon atoms; each $R^3$ is independently methyl or ethyl; $R^2$ denotes a monovalent organic group; v has a value of 0 to 200; and w has a value of 0 to 200, provided that the sum of (v+w) is greater than 0, capable of reacting with said hydrogen siloxane, and a catalyst for said reaction, to a first in a series of at least one continuously stirred tanked reactor (CSTR), and continuously withdrawing from the last CSTR in said series a crude product stream that contains siloxane copolymer and unreacted hydrogen siloxane moieties and olefinically substituted block or random polyoxyalkylene; and (b) continuously feeding the product stream of step (a) to at least one plug flow reactor wherein a product stream is withdrawn continuously, wherein said reactions of steps (a) and (b) are catalyzed by a noble metal catalyst.

2. The product of claim 1 herein the hydrogen siloxane and said olefinic compounds are reacted in said series of CSTRs to a sufficient extent that said crude product stream is sufficiently homogenous that the crude product stream does not undergo phase separation in step (b).

3. The product of claim 1 wherein there are at least two CSTRs.

4. The product of claim 3 wherein the stream of exiting the next to last of said series of CSTRs is homogenous.

5. The product of claim 1 wherein said hydrogen siloxane comprises any combination of siloxane units selected from the group consisting of $R_3SiO_{1/2}$, $R_2HSiO_{1/2}$, $R_2SiO_{2/2}$, $RHSiO_{2/2}$, $RSiO_{3/2}$, $HSiO_{3/2}$ and $SiO_{4/2}$, provided that the hydrogen siloxane contains sufficient R-containing siloxane units to provide from 1.0 to 3.0 R radicals per silicon atom and sufficient H-containing siloxane units to provide from 0.01 to 1.0 silicon-bonded hydrogen atoms per silicon atom and a total of R radicals and silicon-bonded hydrogen atoms of from 1.5 to 3.0 per silicon atom, and each R group is independently the same or different and each represents a $C_1$ to $C_{12}$ alkyl radical, a cycloaliphatic radical containing 5 to 12 carbon atoms, or a phenyl radical optionally substituted with 1 to 6 alkyl groups of up to 6 carbon atoms.

6. The product of claim 5 wherein each R is methyl.

7. The product according to claim 1 wherein $R^2$ has the same meaning as $R^1$.

8. The product of claim 1 wherein $R^2$ denotes hydrogen, an alkyl or an alkenyl group containing 1 to 5 carbon atoms, a 2-oxacycloalkyl group of 4 to 6 carbon atoms, an acyl group containing 2 to 5 carbon atoms or a trialkylsilyl group.

9. The product of claim 8 wherein $R^3$ is methyl.

10. The product of claim 9 wherein $R^1$ is allyl.

* * * * *